Sept. 30, 1952  A. W. SILVA  2,611,986
FISHING LURE
Filed Dec. 20, 1949
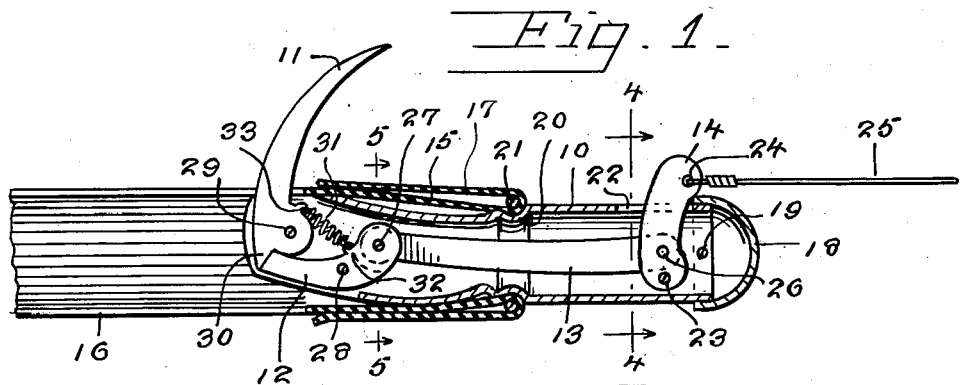
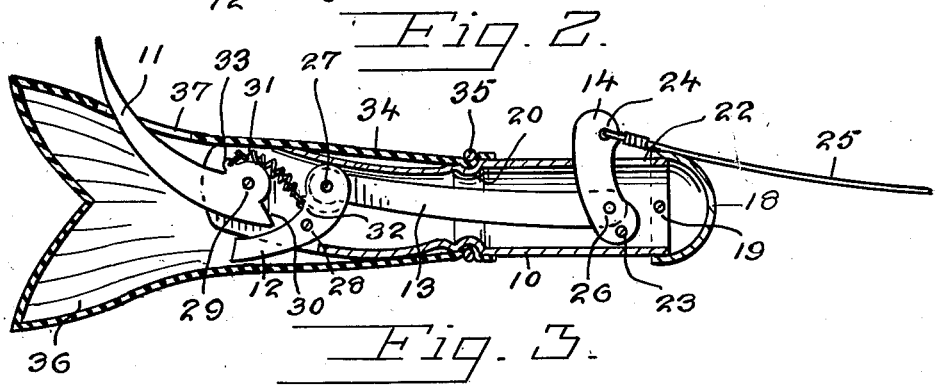
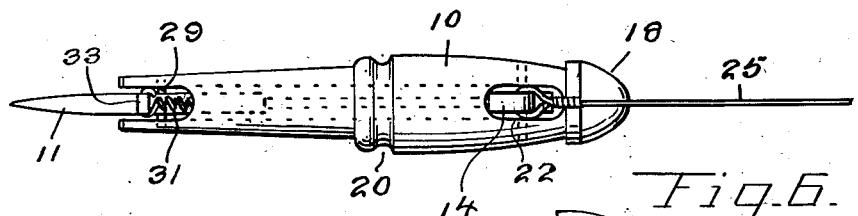
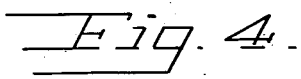
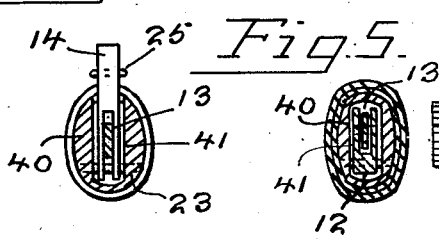
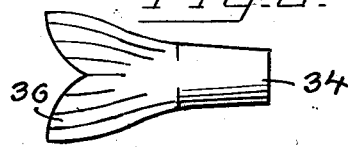
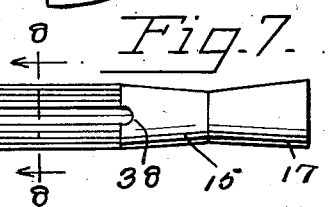
INVENTOR.
Alfred W. Silva
BY Victor J. Evans & Co.
ATTORNEYS Patented Sept. 30, 1952

2,611,986

UNITED STATES PATENT OFFICE 2,611,986

FISHING LURE

Alfred W. Silva, San Diego, Calif.

Application December 20, 1949, Serial No. 134,026

5 Claims. (Cl. 43—42.28)

1

This invention relates to squid fish hooks of the type used in the tuna fish industry, and in particular includes a barb or prong pivotally mounted in a tubular shell with latching means actuated by the fishing line positioned in the shell and arranged to release the prong as tension in the fishing line is relaxed.

The purpose of this invention is to facilitate the removal of large fish such as tuna from hooks of fishing lines as in many instances considerable time is lost in removing the hook from the jaws of the fish.

In the usual type of fish hook having a rigid barb or prong the barbs or extensions at the sides of the point dig into the meat or bone structure of the jaws of the fish and it not only requires considerable time to remove the hook but the operation is very difficult. With this thought in mind this invention contemplates squid fish hooks having a hollow tubular casing with the barb or prong pivotally mounted in the casing and held in the operative position by a latch which is controlled by a fishing line attached to the parts thereof and the latch is provided with a spring that automatically operates the parts to release the prong when the fishing line is slack.

The object of this invention is, therefore, to provide means for constructing a collapsible fish hook whereby the usual prong or barb extended from the shank of the hook may be released when it is desired to remove the fish from the hook.

Another object of the invention is to provide means for automatically releasing prongs of fish hooks that may be used in hooks of different sizes.

A further object of the invention is to provide a fish hook having a releasable barb or prong which is of a simple and economical construction.

With these and other objects and advantages in view the invention embodies an elongated tubular body having a prong extended from the side at one end with latching means in the body for holding the prong extended when tension on a fishing line attached to the latching means is applied, and the body may be provided with a covering of feathers or other materials to camouflage the bait.

Other features and advantages of this invention will appear from the following description taken in connection with the drawings wherein Figure 1 is a longitudinal section through the improved squid bait showing a removable decoy covering thereon and showing the barb or prong in the operative position.

Figure 2 is a longitudinal section similar to the

2 sections shown in Figure 1 showing the prong in the moving position just as it is released and showing a different form of decorative or decoy covering thereon.

Figure 3 is a plan view of the squid bait with the covering removed.

Figure 4 is a cross section through the forward end of the body of the squid bait taken on line 4—4 of Figure 1.

Figure 5 is a similar section taken on line 5—5 of Figure 1.

Figure 6 is a detail illustrating a rubber or feather covering in the form of a fish tail adapted to be applied to the squid bait as illustrated in Figure 2.

Figure 7 is a detail showing a covering for the squid bait in which a plurality of thin rubber strands extend from the end thereof.

Figure 8 is a cross section through the covering showing the rubber strands taken on line 8—8 of Figure 7.

Referring now to the drawing wherein like reference characters denote corresponding parts the improved squid bait of this invention includes a hollow body 10 having a prong 11 pivotally mounted in one end and held in an operative position by a pivotally mounted latch 12, a link 13 and a lever 14 and, in the design illustrated in Figure 1 the squid bait body is covered by a tubular covering 15 having extended fingers 16 and a skirt 17.

The forward end of the body 10 is provided with a cap 18 that is secured to the body by a pin 19. The body 10 is also provided with an annular recess 20 in which the covering 15 is secured by a spring or rubber ring 21, and a slot 22, through which the lever 14 extends.

The lever 14 is pivotally mounted on one end in the body on the pin 23 in such a manner as to extend through the slot 22 and the other end of said lever is provided with an opening 24 through which a fishing line 25 is attached thereto. The lever 14 is pivotally attached to one end of the link 13 by a pin 26 located intermediate its ends and the opposite end of the link is pivotally attached to one end of the latch 12 by a pin 27. The latch is pivotally mounted intermediate its ends in the body by a pin 28 and prong 11 is pivotally mounted on a pin 29. The prong 11 is provided with a tooth or shoulder 30 against which the end of latch 12 may be positioned, as shown in Figure 1 and when tension on the fishing line 25 is relieved the inner end of the latch 12 to which the link is pivotally attached is drawn upwardly by a spring 31 which is attached to the latch at the point 32, and to the prong through an eye 33, whereby the opposite end of the latch moves downwardly to the position shown in Figure 2 and releases the prong 11.

With the prong 11 released the squid bait may readily be drawn from the mouth of a tuna fish or the like. The device may be reset by moving the prong 11 forwardly until the latch snaps back against shoulder 30.

The housing of the squid bait forming the body 10 may be of any suitable design and may be arranged to represent a fish or other type of bait. In the design shown the head or cap 18 represents the head of a fish and the tapering body portion, as illustrated in Figures 1 and 3 represents the body of the fish.

The squid bait may, however, be covered with hair, or feathers, or as illustrated in Figures 1 and 2 a tubular rubber covering 15 may be positioned on the rear portion of the body of the bait and the rubber tube may be split to provide a plurality of waving rubber strands or fingers, as indicated by the numeral 16. The forward end of the tube may be folded over providing a skirt like portion 17.

In the design shown in Figures 2 and 6 the rubber tube 15 is replaced by a tube 34 which is secured in the recess 20 by a rubber ring 35 and the outer end of the tube 34, which is indicated by the numeral 36 is formed to represent the tail of the fish.

A slot 37 may be provided in the upper part of the section 36 of the tube 34 which will accommodate the prong 11 and a similar slot 38 may be provided in the upper part of the tube 15, as shown in Figure 7.

It will be understood that the body 10 may be hollow as illustrated in Figures 1 and 2 or the body may be formed of wood and substantially solid. The body is indicated by the numeral 40 and the slot 41 is provided through the center thereof to accommodate the latch, link and lever.

It will be understood that modifications may be made in the design and arrangement of the parts without departing from the spirit of the invention.

What is claimed is:

1. A squid bait comprising an elongated body, a prong pivotally mounted in the trailing end of the body, a latch pivotally mounted in the body for releasably holding the prong extended outwardly of the body, a line attaching lever pivotally mounted in the forward end of the body, a link connecting the line attaching lever to the latch whereby with tension in a fishing line attached to the line attaching lever the latch retains the prong in an outwardly extended position, and a spring for actuating the latch to release the prong as the fishing line attached to the line attaching lever is released.

2. In a squid bait, the combination which comprises an elongated tubular body having a cap on the forward end, a prong pivotally mounted in the trailing end of the body, a latch pivotally mounted in the body and positioned to hold the prong in an outwardly extended position, a line attaching lever pivotally mounted in the forward end of the body, a link pivotally connecting the line attaching lever to the latch whereby with tension in a fishing line attached to the line attaching lever the latch retains the prong in an outwardly extended position, a spring connected to the latch and prong, a decoy covering having a tubular base positioned over part of the body, and means securing the covering to the body.

3. In a squid bait, the combination which comprises an elongated body having a longitudinally disposed opening therethrough, a prong with a shoulder thereon pivotally mounted in the trailing end of the body, a latch pivotally mounted in the body and positioned whereby one end thereof engages the shoulder of the prong to retain the prong in an outwardly extended position, a line attaching lever pivotally mounted in the forward end of the body, a link pivotally connected to the line attaching lever at one end and to the latch at the other end for retaining the opposite end of the latch in engagement with the shoulder of the prong to hold the prong in the extended position with tension on a fishing line attached to the said line attaching lever, and a spring connecting the latch to the prong for resiliently urging the latch away from the shoulder of the prong.

4. A fish hook comprising a body member a hook pivoted to said body member and having a pointed end extending outwardly of said body member, latch means connected to said body and engageable with said hook for limiting the pivotal movement of said hook in a rearward direction at its pointed end and a line connected to said latch means for holding the same engaged with said hook when said line is in tension, said hook being arranged to extend outwardly and forwardly at its pointed end when held by said latch means and pivotal into a position when disengaged from said latch means wherein said pointed end extends backwardly with respect to said body member.

5. A fish hook comprising a body member, a hook pivoted to said body member and having a pointed end extending outwardly of said body member, latch means connected to said body member and engageable with said hook for limiting the pivotal movement of said hook in a rearward direction at its pointed end, a line connected to said latch means for holding the same engaged with said hook when said line is in tension, said hook being arranged to extend outwardly and forwardly at its pointed end when held by said latch means and pivotal into a position when disengaged from said latch means wherein said pointed end extends backwardly with respect to said body member, and a spring connected to said hook tending to pivot the same into a position wherein said pointed end extends outwardly and forwardly.

ALFRED W. SILVA.

REFERENCES CITED

The following references are of record in the file of this patent:

UNITED STATES PATENTS

| Number | Name | Date |
|---|---|---|
| 635,547 | Howard | Oct. 24, 1899 |
| 1,791,083 | Pike | Feb. 3, 1931 |
| 2,185,668 | Hurdle | Jan. 2, 1940 |
| 2,436,232 | Shetka | Feb. 17, 1948 |